United States Patent [19]

Sivavec et al.

[11] Patent Number: 5,140,077
[45] Date of Patent: Aug. 18, 1992

[54] POLYPHENYLENE ETHER-POLYAMIDE COMPOSITIONS

[75] Inventors: Timothy M. Sivavec; Sharon M. Fukuyama, both of Clifton Park, N.Y.

[73] Assignee: General Electric Company, Schenectady, N.Y.

[21] Appl. No.: 660,368

[22] Filed: Feb. 25, 1991

[51] Int. Cl.$^5$ .................. C08G 65/48; C08L 71/12; C08L 77/00; C08L 53/02
[52] U.S. Cl. .................... 525/397; 525/92; 525/905; 528/501
[58] Field of Search .................. 525/397, 905, 92; 528/501

[56] References Cited

U.S. PATENT DOCUMENTS

| 4,315,086 | 2/1982 | Ueno et al. ........................ 525/391 |
| 4,338,421 | 7/1982 | Maruyama et al. ................. 525/397 |
| 4,600,741 | 7/1986 | Aycock et al. ..................... 524/139 |
| 4,642,358 | 2/1987 | Aycock et al. ..................... 549/245 |
| 4,760,118 | 7/1988 | White et al. ....................... 525/397 |
| 4,808,671 | 2/1989 | Sivavec ............................... 525/397 |
| 4,863,999 | 9/1989 | MacLeay et al. ................... 525/376 |
| 4,873,286 | 10/1989 | Gallucci et al. .................... 525/92 |
| 4,988,775 | 1/1991 | Sivavec et al. .................... 525/397 |

Primary Examiner—James J. Seidleck
Assistant Examiner—Thomas Hamilton, III
Attorney, Agent, or Firm—William H. Pittman; James C. Davis, Jr.

[57] ABSTRACT

Polyphenylene ethers are capped by reaction in the melt, with application of vacuum, with at least one trimellitamide, preferably phenyl 4-aminosalicylate trimellitamide. The preferred melt processing method is extrusion with vacuum venting. By this method, the polyphenylene ether is capped with reactive anhydride groups improving it therm-oxidative stability. The capped polyphenylene ether is capable of forming copolymers with polyamides and said copolymers are useful as compatibilizers for polyphenylene ether-polyamide blends.

15 Claims, No Drawings

POLYPHENYLENE ETHER-POLYAMIDE COMPOSITIONS

This invention relates to polyphenylene ether polyamide compositions, and more particularly to such compositions prepared from polyphenylene ethers functionalized with trimellitamides.

Polyphenylene ethers are a well-known class of polymers characterized by a unique combination of chemical, physical and electrical properties over a temperature range of more than 350° C. extending from a brittle point of about −170° C. to a heat distortion temperature of 190° C. This combination of properties renders them suitable for use as engineering thermoplastics in a broad range of applications which are well known in the art and are disclosed in numerous patents and other publications.

In recent years, there has been considerable interest in combining polyphenylene ethers with other resins to produce compositions with even more advantageous properties. For example, polymers such as polyamides are frequently noted for their solvent resistance and blends of such polymers with polyphenylene ethers might be expected to possess the advantageous properties of the latter and in addition be highly resistant to solvents. However, simple blends of polyphenylene ethers and polyamides are generally incompatible, frequently undergoing phase separation and delamination. They typically contain large, incompletely dispersed polyphenylene ether particles and no phase interaction between the two resin phases.

U.S. Pat. No. 4,642,358 describes the reaction of polyphenylene ethers with such polycarboxylic reactants as trimellitic anhydride acid chloride (TAAC).

A disadvantage of the reaction of polyphenylene ethers with TAAC is that it must be conducted in solution, typically in an organic solvent such as toluene. Polyphenylene ethers are often melt processed rather than solution processed, in which case the requirement of solution functionalization is undesirable. Moreover, the products prepared by this method frequently coagulate, contain large proportions of fines and have substantial chloride content. All of these conditions may be disadvantageous for many utilities of the resulting blends.

In U.S. Pat. No. 4,808,671, there is described the reaction of polyphenylene ethers with 4-esters of trimellitic anhydride in the presence of a catalytic amount of at least one triaryl phosphite. This process may be conducted in the melt and may utilize such trimellitic acid esters as the 4-(o-carbophenoxyphenyl) ester, also known as the 4-(phenylsalicylate) ester, of trimellitic anhydride. Esters of this type react with polyphenylene ethers in two ways: by functionalizing it with functionality derived from the 4-ester of trimellitic anhydride and by capping unfunctionalized molecules with salicylate in accordance with U.S. Pat. No. 4,760,118. The disadvantage of this method is the requirement for triaryl phosphite catalysis in order to promote complete reaction. In the absence of triaryl phosphite, the functionalization reaction is incomplete and substantial proportions of residual trimellitic anhydride 4-ester may remain in the production, with possible detrimental results.

U.S. Pat. No. 4,988,775 discloses a method of producing a dicarboxylate-capped polyphenylene ether capable of forming blends with polyamides having high impact and tensile strength. The above-mentioned dicarboxylate-capped polyphenylene ethers are prepared by melt blending with application of vacuum at least one polyphenylene ether with at least one trimellitic anhydride salicylate ester.

In commonly owned, copending application Ser. No. 07-660,310 filed Feb. 29, 1991 an economic and convenient method for incorporating anhydride functionality into the polyphenylene ether resin at its phenolic end groups in a faster and more selective manner than in the above mentioned transesterification process is disclosed and claimed. The process of the invention in copending application Ser. No. 07-660310 is believed to afford a single cap on the polyphenylene ether, whereas the above mentioned dicarboxylate polyphenylene ethers have both salycilate and TAAC capping. The present invention may provide polyphenylene ethers with a low total hydroxyl content and hence greatly improved thermo-oxidative stability.

Accordingly, in one of its aspects the present invention relates to compositions containing copolymers of trimellitamide-capped polyphenylene ethers and polyamides useful in the preparation of compatibilized blends of polyphenylene ethers and polyamides.

The present invention uses a trimellitamide capped polyphenylene ether composition prepared by melt blending, with application of vacuum, at least one polyphenylene ether with at least one trimellitamide selected from the group consisting of phenyl 4-aminosalicylate trimellitamide, acetyl 4-aminosalicylic acid trimellitamide and acetyl 5-aminosalicylic acid trimellitamide.

The trimellitamides useful in the present invention are prepared by the reaction of their respective aminosalicylic acids with trimellitic anhydride acid chloride. It is believed that the amides of phenyl 4-aminosalicylate trimellitamide, acetyl 4-aminosalicylic acid, acetyl 5-aminosalicylic acid with functionalities other than trimellityl anhydride, such as carboxylic acid functionalities would also functionalize the polyphenylene ether resin.

The melt blending operation may be performed in conventional melt blending apparatus of both the batch and continuous type. It is often preferably conducted continuously in an extruder, by reason of the excellent properties of extruded materials and the availability of extruders in commercial polymer processing facilities. Typical conditions include temperatures in the range of about 250°–350° C. The proportion of trimellitamide employed is not critical and will depend on the degree of capping desired. It is most often about 2–3% but may be as high as about 10% by weight based on polyphenylene ether.

It is essential that the blending be conducted with application of vacuum. In general, blending processes involving pressures below about 20 torr for at least a portion of the process are desirable. Extrusion processes of this type may be conducted by means of vacuum venting, whereby a vacuum is drawn on at least one vent in the extruder.

It has been found that reaction between the polyphenylene ether and the trimellitamide is facilitated if the polyphenylene ether has also been melt processed under vacuum prior to formation of the blend with the amide. This melt processing operation may also be conveniently effected via extrusion with vacuum venting. Polyphenylene ether-polyamide compositions prepared from the dicarboxylate-capped polyphenylene ethers used in this invention are generally improved in several respects by repeated extrusion of the capped polyphenylene ether. Optimum conditions are often provided if the capped polyphenylene ether is again melt processed (e.g., reextruded) at least once, also under vacuum.

In addition, the properties of polyphenylene ether-polyamide compositions prepared from the dicarboxylate-capped polyphenylene ethers used in the invention are generally improved in several respects by repeated extrusion of the capped polyphenylene ether. Optimum conditions are often provided if the capped polyphenylene ether is again melt processed (g.e., reextruded) at least once, also under vacuum.

The polyphenylene ethers used in the present invention comprise a plurality of structural units having the formula

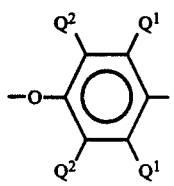
(I)

In each of the units independently, each $Q^1$ is independently halogen, primary or secondary lower alkyl (i.e., alkyl containing up to 7 carbon atoms), phenyl, haloalkyl, aminoalkyl, hydrocarbonoxy or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl and each $Q^2$ is hydrogen. Suitable polyphenylene ethers are disclosed in a large number of patents.

Both homopolymer and copolymer polyphenylene ethers are included. Suitable homopolymers are those containing 2,6-dimethyl-1,4-phenylene ether units. Suitable copolymers include random copolymers containing such units in combination with (for example) 2,3,6-trimethyl-1,4-phenylene ether units.

Also included are polyphenylene ethers containing moieties which modify properties such as molecular weight, melt viscosity and/or impact strength Such polymers may be prepared by grafting onto the polyphenylene ether such vinyl monomers as acrylonitrile and vinylaromatic compounds (e.g., styrene), or such polymers as polystyrenes and elastomers. Other suitable polymers are the coupled polyphenylene ethers in which the coupling agent is reacted with the hydroxy groups of two polyphenylene ether chains to produce a higher molecular weight polymer containing the reaction product of the hydroxy groups and the coupling agent, provided a substantial proportion of free hydroxy groups remain present. Illustrative coupling agents are low molecular weight polycarbonates, quinones and heterocycles.

The polyphenylene ether generally has a number average molecular weight within the range of about 3,000 to 40,000 and a weight average molecular weight within the range of 20,000-80,000 as determined by gel permeation chromatography. Its intrinsic viscosity is most often in the range of about 0.15 dl./g. to about 0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether) and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, hydroxyoximes (monomeric and polymeric), o-hydroxyaryl oximes and β-diketones. Also useful are known cobalt-containing catalyst systems.

Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

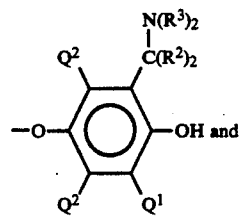
(I)

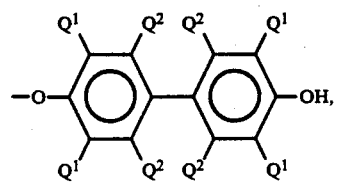
(III)

wherein $Q^1$ and $Q^2$ are as previously defined; each $R^2$ is independently hydrogen or alkyl with the proviso that the total number of carbon atoms in both $R^2$ radicals is 6 or less; and each $R^3$ is independently hydrogen or a $C_{1-6}$ primary alkyl radical. Preferably, each $R^2$ is hydrogen and each $R^3$ is alkyl, especially methyl or n-butyl.

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

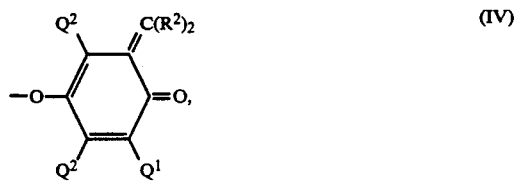

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula VI are typically obtained from reaction mixtures in which a by-product diphenoquinone of the formula

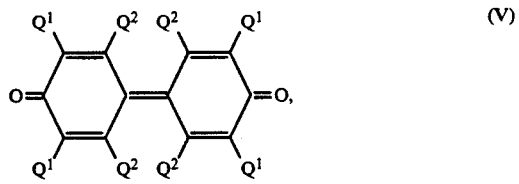

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units of ancillary chemical features.

Polyamides suitable for use in the preparation of the compositions of this invention may be made by any known method, including the polymerization of a monoamino-monocarboxylic acid or a lactam thereof having at least 2 carbon atoms between the amino and carboxylic acid or a lactam thereof as defined above together with substantially equimolar proportions of a diamine and a dicarboxylic acid. (the term "substantially equimolar" proportions includes both strictly equimolar proportions and slight departures therefrom which are involved in conventional techniques for stabilizing the viscosity of the resultant polyamides.) The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. Particular examples of aminocarboxylic acids and lactams are ε-aminocaproic acid, butyrolactam, pivalolcatam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Such diamines include, for example, those represented by the general formula

wherein n is an integer of from 2 to 16. Illustrative diamines are trimethylenediamine, tetramethylenediamine, pentamethylenediamine, octamethylenediamine, hexamethylenediamine (which is often preferred), trimethylhexamethylenediamine, m-phenylenediamine and mxylylenediamine.

The dicarboxylic acids may be represented by the formula

wherein W is a divalent aliphatic or aromatic group containing at least 2 carbon atoms. Examples of aliphatic acids are sebacic acid, octadecanedioic acid, suberic acid, glutaric acid, pimelic acid and adipic acid. Aromatic acids, such as isophthalic and terephthalic acids, are preferred.

Typical examples of the polyamides or nylons, as these are often called, include polyamide-6, 66, 11, 12, 63, 64, 6/10 and 6/12 as well as polyamides from terephthalic acid and/or isophthalic acid and trimethylhexamethylene-diamine; from adipic acid and mxylylenediamines; from adipic acid, azelaic acid and 2,2-bis(p-aminocyclohexyl)propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 66, 11 and 12, most preferably polyamide-66.

Copolymer formation according to the invention is believed to be the result of reaction between the dicarboxylate end groups of the polyphenylene ether and amine groups in the polyamide, forming imide linkages. Accordingly, the presence of a substantial proportion of amine end groups in the polyamide is preferred. If such amine end groups are not present in substantial proportion, partial degradation of the polyimide is necessary to enable the formation of the desired copolymers.

To prepare the copolymer compositions of this invention, the dicarboxylate-capped polyphenylene ether and polyamide are heated together in solution or, preferably, in the melt. Here, as in the operations previously described, melt processing under vacuum is especially preferred and extrusion with vacuum venting is most preferred The reaction temperature is typically within the range of about 100°-350° C.

The proportions of functionalized polyphenylene ether and polyamide are not critical and may be adjusted over a wide range to yield copolymer compositions having the desired properties. The polyphenylene ether-polyamide compositions, however, generally contain about 5-75% by weight polyphenylene ether and about 25-95% polyamide.

In general, the compositions of this invention comprise only partially copolymer, with the balance being a polyphenylene ether-polyamide blend. It is also within the scope of the invention to incorporate uncapped polyphenylene ether in the composition, said uncapped polyphenylene ether frequently comprising up to about 50% by weight of total polyphenylene ether. In general, however, optimum properties are obtained when no uncapped polyphenylene ether is separately added.

The polyphenylene ether-polyamide compositions of this invention may also contain ingredients other than the copolymer, polyphenylene ether and polyamide. A particularly useful other ingredient in many instances is at least one elastomeric impact modifier which is compatible with the polyphenylene ether. It is generally present in the amount of about 5-25% by weight of resinous components.

Impact modifiers for polyphenylene ether-polyamide compositions are well known in the art. They are typically derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof.

A particularly useful class of impact modifiers are those derived from the vinyl aromatic monomers These include, for example, modified and unmodified polystyrenes, ABS type graft copolymers, AB and ABA type block and radial block copolymers and vinyl aromatic conjugated diene core shell graft copolymers. Modified and unmodified polystyrenes include homopolystyrenes and rubber modified polystyrenes, such as butadiene rubber-modified polystyrene (otherwise referred to as high impact polystyrene or HIPS). Additional useful polystyrenes include copolymers of styrene and various monomers, including, for example, poly (styrene-acrylonitrile) (SAN), styrene-butadiene copolymers as well as the modified alpha- and para-substituted styrenes and any of the styrene resins disclosed in U.S. Pat. No. 3,383,435, herein incorporated by reference. ABS types of graft copolymers are typified as comprising a rubber polymeric backbone derived from a conjugated diene alone or in combination with a monomer copolymerizable therewith having grafted thereon at least one monomer, and preferably two, selected from the group consisting of monoalkenylarene monomers and substituted derivatives thereof as well as acrylic monomers such as acrylonitriles and acrylic and alkylarcrylic acids and their esters.

As especially preferred subclass of vinyl aromatic monomer-derived resins is the block copolymers comprising monoalkenyl arene (usually styrene) blocks and conjugated diene (e.g., butadiene or isoprene) blocks and represented as AB and ABA block copolymers. The conjugated diene blocks may be selectively hydrogenated.

Suitable AB type block copolymers are disclosed in, for example, U.S. Pat. Nos. 3,078,254; 3,402,159; 3,297,793; 3,265,765 and 3,594,452 and UK Patent 1,264,741, all incorporated herein by reference. Examples of typical species of AB block copolymers are polystyrene-polybutadiene (SRB), polystyrene-polyisoprene and poly (alpha-methylstyrene)-polybutadiene. Such AB block copolymers are available commercially from a number of sources, including Phillips Petroleum under the trademark SOLPRENE.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Examples of triblock copolymers include polystyrene-polybutadiene-polystyrene (SBS), polystyrenepolyisoprene-polystyrene (SIS), poly(a-methylstyrene)polybutadiene-poly-(a-methylstyrene) and poly(amethylstyrene)-polyisoprene-poly-(a methylstyrene). Particularly preferred triblock copolymers are available commercially as CARIFLEX~, KRATON D~ and KRATON G~ from Shell.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, butadiene-glycidyl methacrylate copolymers, isoprene-isobutylene copolymers, chlorobutadiene polymers, butadiene-acrylonitrile copolymers, polyisoprene, and the like. Ethylene-propylene-diene monomer rubbers may also be used. These EPDM'S are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM611, KM-653 and KM-330, and are described in U.S. Pat. Nos. 3,808,180; 4,034,013; 4,096,202; 4,180,494 and 4,292,233.

Also useful are the core-shell copolymers wherein an interpenetrating network of the resins employed characterizes the interface between the core and shell. Especially preferred in this regard are the ASA type copolymers available from General Electric Company and sold as GELOY- resin and described in U.S. Pat. No. 3,944,631.

In addition, there may be employed the above described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, ethylenepropylene rubber, thermoplastic polyester elastomers and thermoplastic etherester elastomers.

The preferred impact modifiers are block (typically diblock, triblock or radial teleblock) copolymers of alkenylaromatic compounds and olefins or dienes. Most often, at least one block is derived from styrene and at least one other block from at least one of butadiene, isoprene, ethylene and butylene. Especially preferred are the triblock copolymers with polystyrene end blocks and olefin- or dienederived midblocks. When one of the blocks is derived from three or more dienes, it is frequently advantageous to reduce the aliphatic unsaturation therein by selective hydrogenation. The weight average molecular weights of the impact modifiers are typically in the range of about 50,000–300,000. Block copolymers of this type are commercially available from Shell Chemical Company under the trademark KRATON, and include KRATON D1101, G1650, G1651, G1652, G1657 and G1702.

Other conventional ingredients which may be present in the copolymer-containing compositions of this invention include fillers, flame retardants, colorants, stabilizers, antistatic agents, mold release agents and the like, used in conventional amounts. The presence of other resinous components is also contemplated.

In order that those skilled in the art may be better able to practice the present invention, the following examples are given as illustrations of the preparation of the polyamide-trimellitamide functionalized polyphenylene ether blends and copolymers of the present invention. It should be noted that the invention is not limited to the specific details embodied in the examples.

EXAMPLES 1-5

Dry blends of functionalized and unfunctionalized polyphenylene ether, nylon 6,6 (NP 10,000 extrudate), and Kraton G 1651 (a styrene-butadiene-styrene triblock copolymer) were prepared using the following formulations:

| Extruder-functionalized polyphenylene ether | 49 parts |
|---|---|
| Nylon 6,6 | 41 |
| KG 1651 | 10 |

The polyphenylene ethers were extruded with phenyl 4-aminosalicylate trimellitamide in weight percentages relative to the amount of polyphenylene ether present. Each was blended in a Henschel mill then extruded through a Werner & Pfleiderer 28 mm twin screw extruder (polyphenylene ether devol. screw design, screw speed 300 rpm, temperature profile 150°,260°,290°,285°,260°,260° C. (die) with vacuum venting applied to zone 5. The extrudate was quenched in water, pelletized, dried in a circulating air oven for 4 hours at 100°–115° C., and injection molded on an Engel 28 ton injection molder: mold temperature 170° F. (movable), 176° C. (fixed), temperature profile 570 (die), 550°,520°,500° F. Injection pressure 250 psi, hold pressure 350 psi, shot size 17.2 (HDT,N.I. and mini tensile bars), injection speed: medium setting.

| Standard molding conditions | |
|---|---|
| injection time | 8 sec. |
| cooling time | 12 sec. |
| mold open time | 2 sec. |
| cycle time | 26 sec. |
| residence time | 2 min. |

Notched Izod impact values were determined according to ASTM#D256 and tensile values were determined according to ASTM#D638. HDT values were obtained at 66 psi stress according to ASTM#648.

TABLE 1

Physical Properties of PPO-Nylon 6,6 Blends[a]

| Example | Wt % Phenyl Aminosalicylate Trimellitamide | PPO 0.42 dl/g | N.I. (ft-lb/in) | Tensil Strength @Yield(psi) | Tensile Strength @Break(psi) | Elong (%) | HDT °F. @66 psi |
|---|---|---|---|---|---|---|---|
| 1. (Control) | 0 | powder | 0.3 | 7612 | 7612 | 13 | 385 |
| 2. | 2.5 | powder | 5.6 | 7675 | 8620 | 183 | 386 |
| 3. | 3.0 | powder | 3.8 | 7234 | 7643 | 206 | 396 |
| 4. | 2.0 | v.v[b] pellets | 5.1 | 7652 | 8534 | 178 | — |
| 5. | 2.5 | v.v. pellets | 4.4 | 7710 | 8365 | 154 | 389 |

[a]All polyphenylene ether Nylon 6,6 blends were made using the following formulation: Extruder funct. PPO (49 parts), nylon 6,6 (41 parts), Kraton G 1651 (10 parts).
[b]v.v = vacuum vented.

Table 1 indicates maximum Notched Izod impact values for polyphenylene ether-nylon 6,6 blends obtained using 2.5 weight % phenyl 4-aminosalicylate trimellitamide when employing vacuum vented polyphenylene ether extrudate. Increasing these levels of functionalizing agent by as little as 0.5 weight % resulted in lowered N.I. impact values. The weight % values given in Table 1 are relative to polyphenylene ether and would be approximately half that when given relative to the polyphenylene ether-nylon blend. Melt reaction of equal amount of polyphenylene ether (previously extruded with 2.5 weight % phenyl 4-aminosalicylate trimellitamide) with nylon 6,6 followed by sequential extractions with chloroform and formic acid afforded a polyphenylene ether-nylon copolymer (copolymer composition: 81% polyphenylene ether and 9% nylon 6,6). In this example, 24% of the starting polyphenylene ether was found to be bound to nylon.

Smaller amounts of functionalizing agent were found necessary to achieve similar impact properties when vacuum vented polyphenylene ether extrudate was substituted for polyphenylene ether powder. It was found that the efficiency of the capping reaction is improved when vacuum vented polyphenylene ether extrudate was used. It is believed that the improved efficiency can be attributed to the fact that processed polyphenylene ether has already lost dibutylamine through aminoalkyl-substituted end group decomposition. Evolved dibutylamine, therefore, does not react with functionalizing agent.

Obviously, other modifications and variations of the present invention are possible in light of the above teachings. It is therefore to be understood that changes may be made in particular embodiments of the invention described which are within the full intended scope of the invention as defined by the claims. It is to be further understood that all patents mentioned above are to be incorporated herein by reference.

What is claimed is:

1. A composition comprising at least one polyamide and a trimellitamide-capped polyphenylene ether composition prepared by melt blending, with application of vacuum, at least one polyphenylene ether with at least one trimellitamide selected from the group consisting of phenyl 4-aminosalicylate trimellitamide, acetyl 4-aminosalicylic acid trimellitamide and acetyl 5-aminosalicylic acid trimellitamide.

2. A composition according to claim 1 wherein the trimellitamide is of the formula

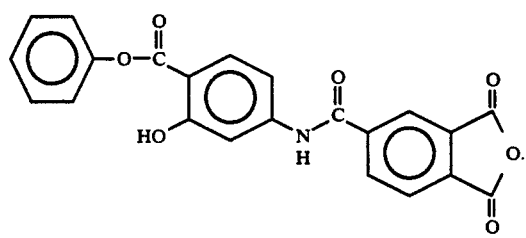

3. A composition according to claim 1 wherein the polyphenylene ether comprises a plurality of structural units having the formula

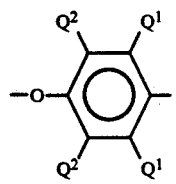

(I)

wherein each $Q^1$ is independently halogen, primary or secondary lower alkyl, phenyl, haloalkyl, aminoalkyl, hydrocarbonoxy, or halohydrocarbonoxy wherein at least two carbon atoms separate the halogen, and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

4. A composition according to claim 3 wherein the polyphenylene ether is a poly(2,6-dimethyl-1,4-phenylene ether).

5. A composition according to claim 4 wherein the polyamide is a polyamide-6 or a polyamide-66.

6. A composition according to claim 5 which comprises about 5-75% by weight polyphenylene ether and about 25-95% polyamide.

7. A composition according to claim 6 which also contains uncapped polyphenylene ether in an amount up to about 50% by weight of total polyphenylene ether.

8. A composition according to claim 6 which also comprises an elastomeric impact modifier.

9. A composition according to claim 8 wherein the impact modifier is a triblock copolymer wherein the end blocks are derived from styrene and the midblock is derived from at least one of isoprene and butadiene.

10. A method according to claim 9 wherein the midblock has been hydrogenated.

11. A composition according to claim 1 wherein the trimellitamide is of the formula

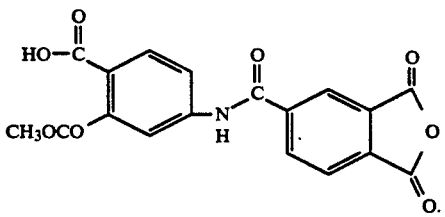

12. A composition according to claim 1 wherein the trimellitamide is of the formula

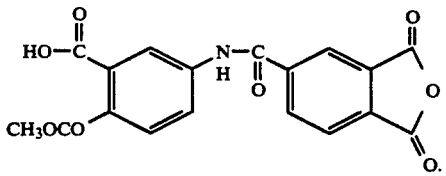

13. A composition according to claim 8 wherein the trimellitamide is of the formula

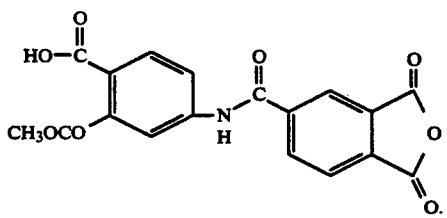

14. A composition according to claim 8 wherein the trimellitamide is of the formula

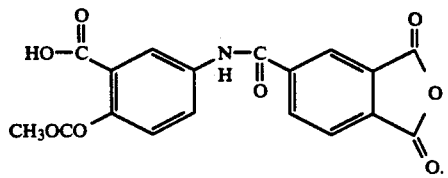

15. A composition according to claim 8 wherein the trimellitamide is of the formula
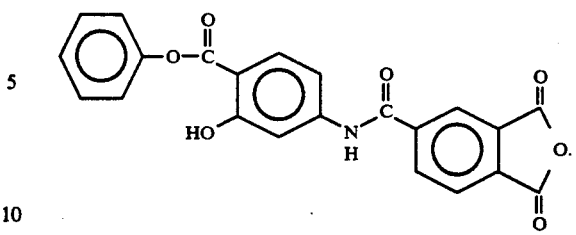
* * * * *